United States Patent [19]

Nakamura et al.

[11] 4,176,646

[45] Dec. 4, 1979

[54] METHOD OF IGNITING IN AN INTERNAL COMBUSTION ENGINE

[75] Inventors: Norihiko Nakamura, Mishima; Takashi Kato; Tatsuo Kobayashi, both of Susono, all of Japan

[73] Assignee: Toyota Jidosha Kogyo Kabushiki Kaisha, Toyota, Japan

[21] Appl. No.: 801,800

[22] Filed: May 31, 1977

[30] Foreign Application Priority Data

Mar. 28, 1977 [JP] Japan .................. 52-33308

[51] Int. Cl.$^2$ ................ F02P 5/04; F02B 19/12; F02M 25/06
[52] U.S. Cl. ............. 123/148 E; 123/32 SP; 123/111 A; 123/191 S
[58] Field of Search ........... 123/191 S, 148 R, 148 E, 123/32 SP, 119 A; 60/278, 293

[56] References Cited

U.S. PATENT DOCUMENTS

| | | | |
|---|---|---|---|
| 3,921,605 | 11/1975 | Wyczalek | 123/148 E |
| 3,999,530 | 12/1976 | Kunii | 123/191 S |
| 4,029,072 | 6/1977 | Goto et al. | 123/148 R |
| 4,038,959 | 8/1977 | Takizawa et al. | 123/191 S |
| 4,041,923 | 8/1977 | Konishi et al. | 123/191 S |
| 4,048,973 | 9/1977 | Sanda et al. | 123/191 S |
| 4,069,666 | 1/1978 | Nakamura | 60/293 |

FOREIGN PATENT DOCUMENTS

2622322 12/1976 Fed. Rep. of Germany ............ 60/278

OTHER PUBLICATIONS

Burgett et al., "Measuring the Effect of Spark Plug and Ignition System Design on Engine Performance"; Jan. 10-14, 1972; Society of Automotive Engineers Publication 720007.

*Primary Examiner*—Charles J. Myhre
*Assistant Examiner*—Craig R. Feinberg
*Attorney, Agent, or Firm*—Stevens, Davis, Miller & Mosher

[57] ABSTRACT

Disclosed is a method of igniting in an internal combustion engine comprising a main combustion chamber and an auxiliary combustion chamber which are interconnected to each other by a connecting passage. The spark gap of the spark plug is located in the connecting passage. A ratio of the volume of the auxiliary combustion chamber to the cross-sectional area of the connecting passage is set in the range of 5 through 15 cm for creating a strong swirl motion of the combustible mixture in the auxiliary combustion chamber at the time of the compression stroke. The length of the continuance time of the discharging arc is set at approximately 1 m sec.

6 Claims, 7 Drawing Figures

METHOD OF IGNITING IN AN INTERNAL COMBUSTION ENGINE

DESCRIPTION OF THE INVENTION

The present invention relates to a method of igniting in an internal combustion engine with an auxiliary combustion chamber.

There has been proposed by us an internal combustion engine provided with an auxiliary combustion chamber connected only to a main combustion chamber via a connecting passage. In this engine, the spark gap of a spark plug is located in the connecting passage or in the vicinity of the connecting passage. In addition, a ratio of the volume of the auxiliary combustion chamber to the cross-sectional area of the connecting passage is set in the range of 5 through 15 cm so that, at the time of the compression stroke, a strong swirl motion of the combustible mixture is created in the auxiliary combustion chamber and, in addition, the swirl motion thus created continues until the time the piston reaches the vicinity of the top dead center.

In an internal combustion engine of this type, when the engine is rotating at a low speed, an appropriate turbulence is caused in the auxiliary combustion chamber during the growing time of the flame. As a result of this, the flame can rapidly spread over the entire space of the auxiliary combustion chamber, whereby the combustion speed in the auxiliary combustion chamber is quickened and, as a result, stable combustion can be obtained. Contrary to this, when the engine is operating at a high speed under a light load close to no load, the velocity of the combustible mixture flowing in the connecting passage is extremely high. As a result of this, since the discharging arc created in the spark gap of the spark plug is extinguished due to the high velocity of the stream of the combustible mixture, it is very difficult to ignite the combustible mixture by means of the spark plug. On the other hand, even if the combustible mixture is ignited by the spark plug, since the turbulence in the auxiliary combustion chamber is excessively strong and, in addition, a large amount of the residual exhaust gas remains in the auxiliary combustion chamber, the flame cannot propagate into the auxiliary combustion chamber. This results in a disadvantage in that there is a tendency for a misfire to occur. Consequently, it is understood that the occurrence of a misfire is due to the fact that the flame of the combustible mixture cannot propagate. However, actually, it should be appreciated that the frequency of occurrence of such a misfire can be so low that a hundred spark ignitions will at most cause one misfire in the auxiliary combustion chamber.

As a method of preventing the occurrence of misfires, which occur as mentioned above, there is a method for retarding the ignition timing of the engine only when the engine is operating at a high speed under a light load close to no load. However, this method has disadvantages in that the fuel consumption is increased and, in addition, it is necessary to provide an additional ignition timing control device in addition to a conventional ignition timing control device.

On the other hand, as a method of preventing the occurrence of misfires, there is another method of increasing the cross-sectional area of the connecting passage, so as to reduce the velocity of the combustible mixture flowing in the connecting passage at the time of the compression stroke and thereby weaken the turbulence generated in the auxiliary combustion chamber. However, this method has disadvantages in that a strong burning jet cannot be injected into the main combustion chamber from the connecting passage and, as a result, since the combustion speed of the combustible mixture in the main combustion chamber is not quickened, a stable combustion cannot be obtained.

Figure 7:
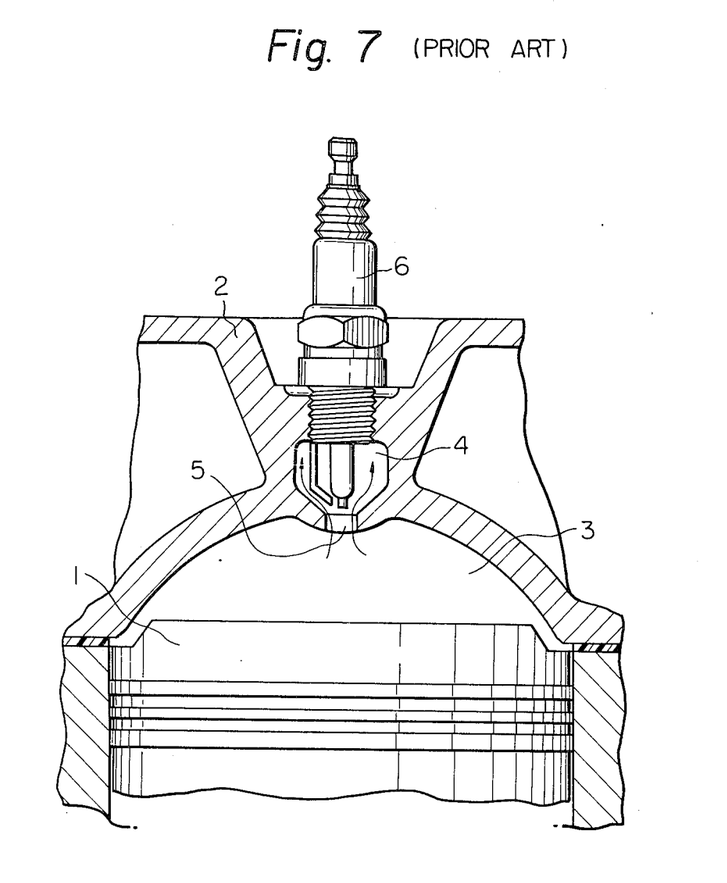
FIG. 7 is a cross-sectional side view of a conventional engine.

In addition, as a further method of preventing the occurrence of misfires, there has been proposed an internal combustion engine in which, as is shown in FIG. 7 of the accompanying drawings, the auxiliary combustion chamber is constructed so as not to create a swirl motion of the combustible mixture in the auxiliary combustion chamber. In FIG. 7, 1 designates a piston, 2 a cylinder head, 3 a main combustion chamber, 4 an auxiliary combustion chamber, 5 a connecting passage and 6 a spark plug. In this engine, while the combustible mixture flows in the connecting passage 5 at a high speed at the time of the compression stroke, a swirl motion of the combustible mixture is not created in the auxiliary combustion chamber. Consequently, the combustible mixture is rapidly decelerated immediately after the combustible mixture flows into the auxiliary combustion chamber. Therefore, even if the engine is operating at a high speed under a light load close to no load, there occurs no misfire. However, when the engine is rotating at a relatively low speed, since the turbulence of the combustible mixture in the auxiliary combustion chamber is weak, the combustion speed in the auxiliary combustion chamber is slow. Therefore, a strong burning jet cannot be injected into the main combustion chamber. This results in increasing the amount of unburned components in the exhaust gas and not improving the output power of the engine. Such a relatively low engine speed is most frequently used in the normal cruising operation of a vehicle and, thus, it is a serious problem that a large amount of unburned components is produced when the engine is operating at a low speed.

In addition, there has been proposed an internal combustion engine in which the ignition energy is elevated five through ten times that in a conventional engine, thereby compulsively igniting the combustible mixture. However, this method causes an increase in the manufacturing cost of a spark plug and also causes a reduction of the life of a spark plug. In addition, with this method, it is necessary to improve the capability of preventing the occurrence of a short circuit in the ignition coil and in a high tension cord, and to increase the capacity of the alternator or generator and the capacity of the battery. Consequently, it is very difficult to put such an engine into practical use.

An object of the present invention is to provide a method of igniting in an internal combustion engine, which is capable of creating a swirl motion of the combustible mixture sufficient to obtain a strong burning jet in the auxiliary combustion chamber when the engine is operating at a relatively low speed, and capable of operating the engine without a misfire occurring when the engine is operating at a high speed under a light load close to no load.

Another object of the present invention is to provide an internal combustion engine capable of further preventing the occurrence of misfire in such a way that secondary air is fed into the exhaust system of the engine so that the oxidation of unburned components is promoted by the secondary air and, at the same time, the amount of the residual exhaust gas in the cylinder of the engine is reduced.

According to the present invention, there is provided a method of igniting a combustible mixture in an internal combustion engine comprising a main combustion chamber, an auxiliary combustion chamber, at least one connecting passage communicating said main combustion chamber with said auxiliary combustion chamber and arranged to create a swirl motion of the combustible mixture in said auxiliary combustion chamber at the time of the compression stroke, a spark plug having a spark gap located in a region consisting of said connecting passage and said main and auxiliary combustion chambers located in the vicinity of said connecting passage, an intake passage for leading an air-fuel mixture into said main combustion chamber, and an exhaust passage for discharging an exhaust gas from said main combustion chamber to the atmosphere, a ratio of the volume of said auxiliary combustion chamber to the cross-sectional area of said connecting passage being set in the range of 5 through 15 cm for creating a strong swirl motion in said auxiliary combustion chamber, wherein the length of the continuance time of the discharging arc created in the spark gap of said spark plug is more than 1 m sec.

The present invention may be more fully understood from the description of preferred embodiments of the invention set forth below, together with the accompanying drawings.

DESCRIPTION OF PREFERRED EMBODIMENTS

Figure 1:
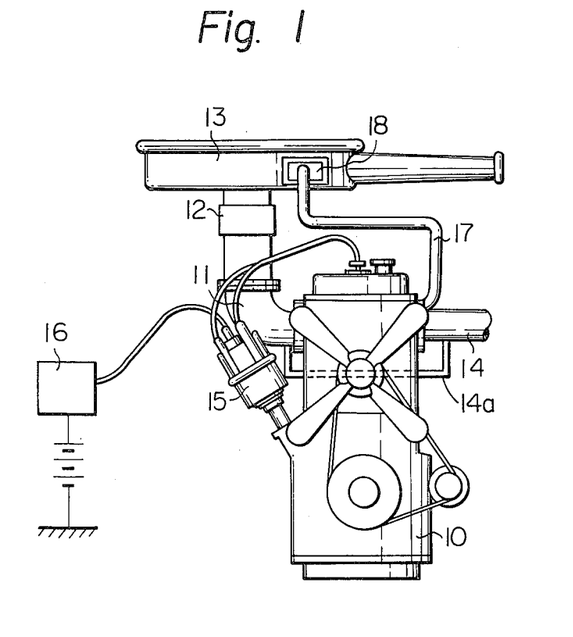
FIG. 1 is a general view of an internal combustion engine.

Referring to FIG. 1, 10 designates an engine body, 11 an intake manifold, 12 a carburetor and 13 an air cleaner; 14 designates an exhaust manifold, 15 a distributor driven by the engine, 16 an ignition power source device connected to the distributor 15 and 17 a secondary air feed conduit. The secondary air feed conduit 17 is connected to the dust portion of the air cleaner 13 via a reed valve 18 and an air filter (not shown) on one hand, and to an exhaust port (not shown) formed in the engine body 10 on the other hand. In operation, when a vacuum is produced in the exhaust manifold due to the pressure pulsation of the exhaust gas, the reed valve 18 is automatically opened, whereby secondary air is fed into the exhaust port via the reed valve 18 and the secondary air feed conduit 17.

In general, in an internal combustion engine, there is a valve overlapping time period during which both the intake valve and the exhaust valve are opened when the piston is in a position near top dead center. Consequently, even if the piston passes through the top dead center position and the intake stroke is started, the exhaust valve remains slightly opened. As a result, at this time, the exhaust gas discharged into the exhaust port is again sucked into the cylinder of the engine via the exhaust valve. Therefore, if secondary air is fed into the exhaust port as mentioned above, secondary air is sucked into the cylinder of the engine during the valve overlapping time period and, as a result, the ratio of the amount of the residual exhaust gas remaining in the combustion chamber to the amount of the air-fuel mixture existing in the combustion chamber immediately before the igniting operation is carried out (hereinafter referred to as a residual gas ratio) is reduced. Needless to say, in this case, a large part of the secondary air fed into the exhaust port is used for promoting the oxidation of unburned components in the exhaust gas.

Figure 2:
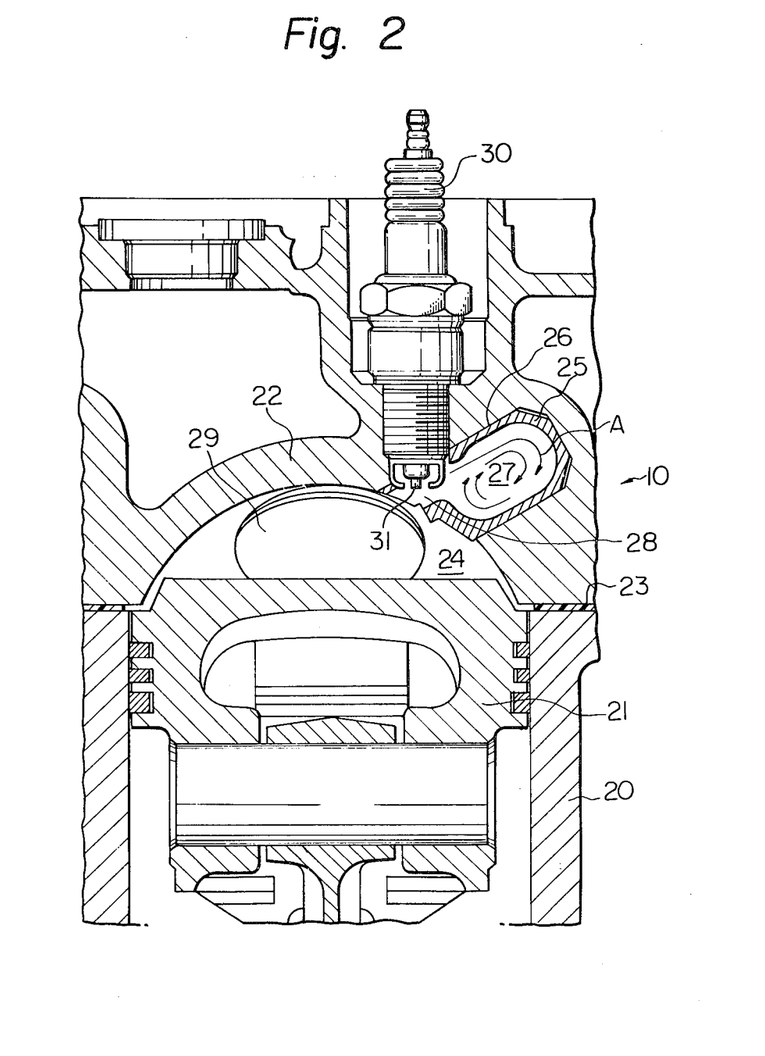
FIG. 2 is a cross-sectional side view of an embodiment of the engine body shown in FIG. 1.

FIG. 2 shows a cross-sectional side view of the engine body 10 shown in FIG. 1. Referring to FIG. 2, 20 designates a cylinder block, 21 a piston reciprocally movable in the cylinder block 20, 22 a cylinder head fixed onto the cylinder block 20 via a gasket 23, and 24 a main combustion chamber formed between the cylinder head 22 and the piston 21; 25 designates an auxiliary chamber component press-fitted into a recess 26 formed in the cylinder head 22, 27 an auxiliary combustion chamber formed in the auxiliary chamber components 25, 28 a connecting passage communicating the main combustion chamber 24 with the auxiliary combustion chamber 27, 29 an intake valve and 30 a spark plug. The spark gap 31 of the spark plug 30 is located in the connecting passage 28 so that the combustible mixture flowing into the auxiliary combustion chamber 27 via the connecting passage 28 at the time of the compression stroke directly impinges upon the electrode of the spark plug 30. In addition, in the embodiment shown in FIG. 2, the ratio of the volume of the auxiliary combustion chamber 27 to the cross-sectional area of the connecting passage 28 is set in the range of 5 through 15 cm.

In operation, at the time of the intake stroke, the combustible mixture formed in the carburetor 12 (FIG. 1) is introduced into the main combustion chamber 24 via the intake valve 29. Then, at the time of the compression stroke, the combustible mixture in the main combustion chamber 24 is forced into the auxiliary combustion chamber 27 via the connecting passage 28. As is shown in FIG. 2, the connecting passage 28 is connected tangentially to the inner wall of the auxiliary combustion chamber 27. Consequently, the combustible mixture forced into the auxiliary combustion chamber 27 causes a strong swirl motion shown by the arrow A in FIG. 2 in the auxiliary combustion chamber 27. Then, the flame of the combustible mixture ignited by the spark plug 30 flows into the auxiliary combustion chamber 27 together with the combustible mixture stream while growing. At this time, since the strong swirl motion of the combustible mixture is created in the auxiliary combustion chamber 27 as mentioned above, the flame rapidly spreads over the entire space of the auxiliary combustion chamber 27. As a result of this, the pressure in the auxiliary combustion chamber 27 is elevated and, then, a strong burning jet is injected into the main combustion chamber 24 from the auxiliary combustion chamber 27 via the connecting passage 28. This strong burning jet causes turbulence in the main combustion chamber 24 and, as a result, the combustible mixture in the main combustion chamber 24 is rapidly burned.

As stated previously, the ratio of the volume of the auxiliary combustion chamber 27 to the cross-sectional area of the connecting passage 28 is set in the range of 5 through 15 cm. By setting the above ratio in the above-mentioned range, even if the engine is operating at a relatively low speed, the turbulence which is extremely suitable for causing a good combustion is created in the auxiliary combustion chamber 27. As a result of this, even if a lean air-fuel mixture having an air-fuel ratio of more than 18:1 or an air-fuel mixture having an approximately stoichiometric air-fuel ratio and containing therein an amount of the exhaust gas of more than 10 percent relative to an amount of the air fed into the cylinder is used (exhaust gas may be recirculated through passage 14a in FIG. 1), a high propagating speed of the flame in the auxiliary combustion chamber 27 can be obtained and a stable growth of the flame can be obtained.

As stated previously, the occurrence of misfires is due to the fact that the flame cannot propagate. Consequently, the possibility of propagation of the flame will be discussed first. In an internal combustion engine as shown in FIG. 2, the velocity U of the combustible mixture flowing through the connecting passage 28 into the auxiliary combustion chamber 27 from the main combustion chamber 24 at the time of the compression stroke is approximately indicated as follows.

$$U = Up \cdot \frac{Vp}{C \cdot Ft} \cdot \frac{A}{V} \quad (1)$$

where
- Up: the velocity of the piston.
- C: flow coefficient of the connecting passage.
- Vp: the volume of the auxiliary combustion chamber.
- Ft: the cross-sectional area of the connecting passage.
- A: the cross-sectional area of the cylinder bore.
- V: the total volume of the main and the auxiliary combustion chambers at a certain crank angle.

As stated previously, in the embodiment shown in FIG. 2, a ratio of Vp to Ft is set in the range of 5 through 15 cm. As is apparent from the above equation (1), the velocity U of the combustible mixture is increased as the number of revolutions of the engine is increased, that is, as the speed Up of the piston is increased. On the other hand, as mentioned in the book "Combustion Flames and Explosions of Gasses" written by Lewis & Von Elbe, the propagation limit of the flame is indicated as follows.

$$K = \frac{\eta o}{Su} \cdot \frac{u'}{l} \quad (2)$$

$$o = \frac{\lambda}{Su \cdot Cp \cdot \rho} \quad (3)$$

where
- ηo: the thickness of the combustion wave.
- Su: laminar combustion speed.
- u': the intensity of the turbulence.
- l: the scale of the turbulence.
- λ: heat conductivity.
- Cp: specific heat.
- ρ: the density of unburned gas.

The following equation can be obtained by combining the above equations (2) and (3).

$$K = \frac{\lambda}{Su^2 \cdot \rho \cdot Cp} \cdot \frac{u'}{l} \quad (4)$$

In the above equation (4), if the value of K is increased beyond 1, the flame cannot propagate, thus causing a misfire. In addition, in the above equation (4), the laminar combustion speed Su and the residual gas ratio RGF have the following relationship.

$$Su = K_1 \cdot \frac{1}{RGF} \quad (5)$$

where $K_1$: a constant. In addition, in the above equation (4), the density ρ of unburned gas and the pressure have the following relationship.

$$\rho = K_2 \cdot P \quad (6)$$

where $K_2$: a constant.

If the residual gas ratio RGF is increased, the laminar combustion speed Su is reduced in the equation (5) and, thus, the value of K is increased in the equation (4). Consequently, it is understood that, if the residual gas ratio RGF is increased, the flame cannot propagate. In addition, if the pressure P is reduced, the density ρ of unburned gas is reduced in the equation (6) and, thus, the value of K is increased in the equation (4). Consequently, it is understood that, if the pressure P is increased, the flame cannot propagate. Furthermore, if the velocity U of the combustible mixture shown in the equation (1) is increased, the intensity u' of the turbulence shown in the equation (4) is increased. Consequently, if the number of revolutions of the engine is increased, the intensity u' of the turbulence is increased. As a result of this, the value of K is increased and, thus, the flame cannot propagate.

Figure 3:
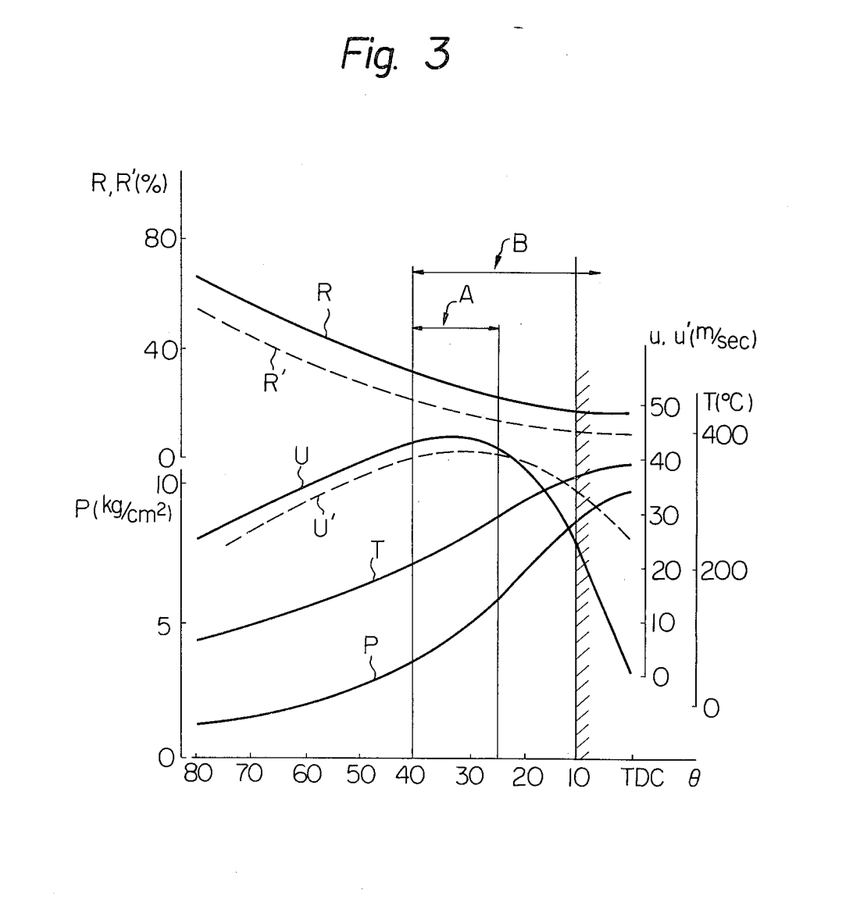
FIG. 3 is a graph showing changes in the residual gas ratio, etc., in the auxiliary combustion chamber.

FIG. 3 shows the residual gas ratio in the auxiliary combustion chamber 27, the pressure in the auxiliary combustion chamber 27, the temperature of the combustible mixture in the auxiliary combustion chamber 27, the velocity of the swirl motion created in the auxiliary combustion chamber 27, and the velocity U of the combustible mixture (see equation (1)) at the time of the compression stroke and at the time when the engine shown in FIG. 2 is rotating at a certain number of revolutions per minute. In FIG. 3, the abscissa indicates crank angle θ. In addition, in FIG. 3, the curved line R indicates the residual gas ratio (%) in the auxiliary combustion chamber 27 in the case wherein secondary air is not fed into the exhaust system of the engine; the curved line R' indicates the residual gas ratio (%) in the auxiliary combustion chamber 27 in the case wherein secondary air is fed into the exhaust system of the engine; the curved line U indicates the velocity (m/sec) of the combustible mixture flowing in the connecting passage 28; the curved line u' indicates the velocity (m/sec) of the swirl motion created in the auxiliary combustion chamber 27; the curved line T indicates the temperature (°C.) of the combustible mixture in the auxiliary combustion chamber 27; and, the curved line P indicates the pressure (kg/cm²) in the auxiliary combustion chamber 27. As shown in FIG. 3, the residual gas ratio R in the auxiliary combustion chamber 27 is decreased as the piston approaches the top dead center position. In addition, if secondary air is fed into the exhaust system of the engine, since a part of the secondary air is sucked into the main combustion chamber 24 during the valve overlapping time period, as stated previously, the residual gas ratio in the main combustion chamber 24 becomes small and, as a result, the residual gas ratio R' in the auxiliary combustion chamber 27 becomes smaller than the residual gas ratio R in the auxiliary combustion chamber 27, as is shown in FIG. 3. In addition, the velocity U of the combustible mixture flowing in the connecting passage 28 is gradually increased until the time the piston reaches a point just before top dead center (BTDC) 30° and, then, the velocity U is rapidly decreased as the piston approaches the top dead center after passing BTDC 30°. On the other hand, the velocity u' of the swirl motion created in the auxiliary combustion chamber 27 is gradually reduced due to the inertia of the combustible mixture after the piston passes BTDC 30° without being rapidly reduced. The temperature T of the combustible mixture in the auxiliary combustion chamber 27 and the pressure P in the auxiliary combustion chamber 27 are slowly increased until the time the piston reaches approximately BTDC 40° and, then, rapidly increased as the piston approaches the top dead center position. In addition, the velocity U of the combustible mixture and the velocity u' of the swirl motion shown in FIG. 3 are increased as the number of revolutions of the engine is increased.

Figure 4:
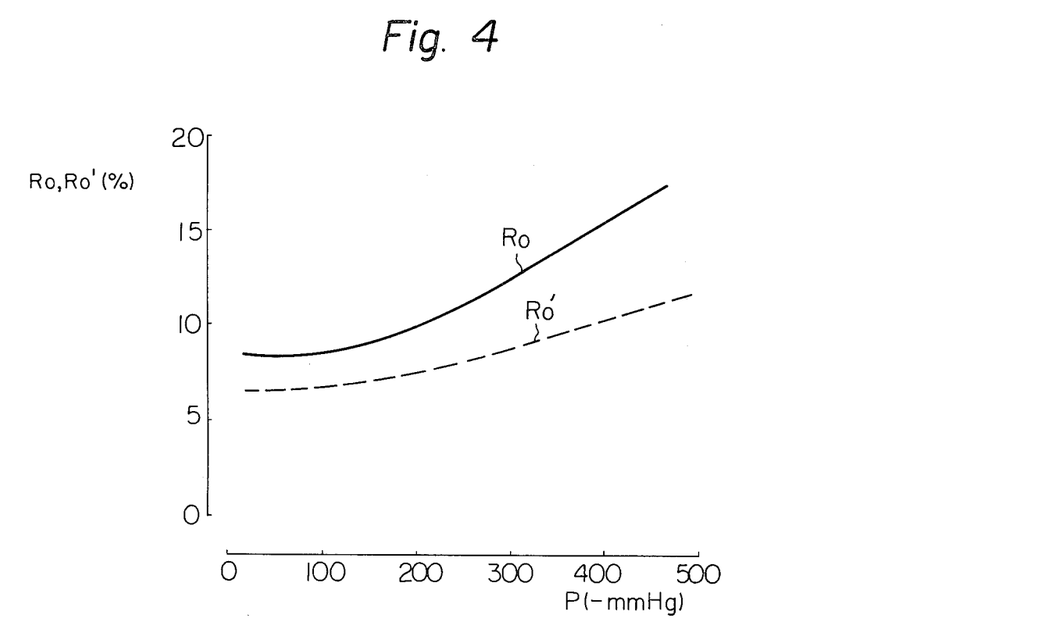
FIG. 4 is a graph showing change in the residual gas ratio in the main combustion chamber.

FIG. 4 shows the relationship between the residual gas ratio in the main combustion chamber 24 and the load level of the engine. In FIG. 4, the abscissa indicates a vacuum level P (−mmHg) in the intake manifold of the engine, and the ordinate indicates the residual gas ratio Ro, Ro' in the main combustion chamber 24. In addition, Ro indicates the residual gas ratio (%) in the case wherein secondary air is not fed into the exhaust system of the engine, while Ro' indicates the residual gas ratio (%) in the case wherein secondary air is fed into the exhaust system of the engine. As is apparent from FIG. 4, the residual gas ratio Ro, Ro' in the main combustion chamber 24 is increased as the vacuum level P in the intake manifold of the engine is increased, that is, as the level of load of the engine is lowered. Consequently, the residual gas ratio R, R' in the auxiliary combustion chamber 27, which is shown in FIG. 3, is also increased as the level of load of the engine is lowered. In addition, as shown in FIG. 4, the residual gas ratio Ro' in the case wherein secondary air is fed into the exhaust system of the engine is smaller than the residual gas ratio Ro in the case wherein secondary air is not fed into the exhaust system of the engine. Furthermore, when the engine is operating under a light load, that is, when the vacuum level P is relatively great, the vacuum level in the main combustion chamber 24 at the time of the intake stroke is relatively large and, thus, the pressure difference between the pressure in the exhaust port and the vacuum in the main combustion chamber 24 is relatively large. As a result of this, if secondary air is fed into the exhaust port of the engine, a large amount of secondary air is sucked into the main combustion chamber 24 during the valve overlapping time period. Consequently, as shown in FIG. 4, when the engine is operating under a light load, the residual gas ratio Ro', in the case wherein secondary air is fed into the exhaust system of the engine, is slightly increased as compared with the case wherein the engine is operating under a heavy load.

As is described with reference to the equations (1) through (6), the lower the pressure P in the auxiliary combustion chamber 27 becomes, the more difficult the flame propagation becomes. In addition, the more the residual gas ratio R in the auxiliary combustion chamber 27 is increased, the more difficult the flame propagation becomes. Furthermore, the more the intensity u' of the turbulence in the auxiliary combustion chamber 27 is increased, that is, the more the velocity U of the combustible mixture flowing in the connecting passage 28 is increased, the more difficult the flame propagation becomes. In addition, as is described with reference to FIG. 3, the velocity U of the combustible mixture is increased as the number of revolutions of the engine is increased, and; in addition, as is described with reference to FIG. 4, the residual gas ratio Ro, Ro' is increased as the level of load of the engine is lowered. Consequently, it is understood that, when the engine is operating at a high speed under a light load close to no load, the flame propagation is very difficult.

Referring to FIG. 3, the arrow A indicates a conventional discharging arc continuance time of the spark plug in the case wherein the engine is operating at a high speed under a light load close to no load. As is shown in FIG. 3, a conventional discharging arc continuance time A is longest in the range of crank angles BTDC 40° through BTDC 25°. As will be understood from FIG. 3, during the discharging arc continuance time, the residual gas ratio R is relatively high and the pressure P in the auxiliary combustion chamber 27 is relatively low. Consequently, in a conventional engine, the value of K shown in the equation (2) stated previously becomes larger than 1 during the discharging arc continuance time and, as a result, even if the combustible mixture is ignited, the flame cannot propagate, thus causing a misfire. In order to prevent the occurrence of such a misfire, there is a method of retarding the ignition timing of the engine. That is, the residual gas ratio R is reduced as the piston approaches the top dead center position and, in addition, the pressure P in the auxiliary combustion chamber 27 is increased as the piston approaches the top dead center position. As a result of this, the value of K shown in the equation (2) is reduced below 1 as the piston approaches the top dead center position. Consequently, if the ignition timing is set so that the igniting operation of the spark plug is carried out when the piston reaches the vicinity of the top dead center position, the flame can propagate. However, the retardation of the ignition timing causes an increase in fuel consumption. The relationship between the ignition timing and the fuel consumption will be described with reference to FIG. 5.

Figure 5:
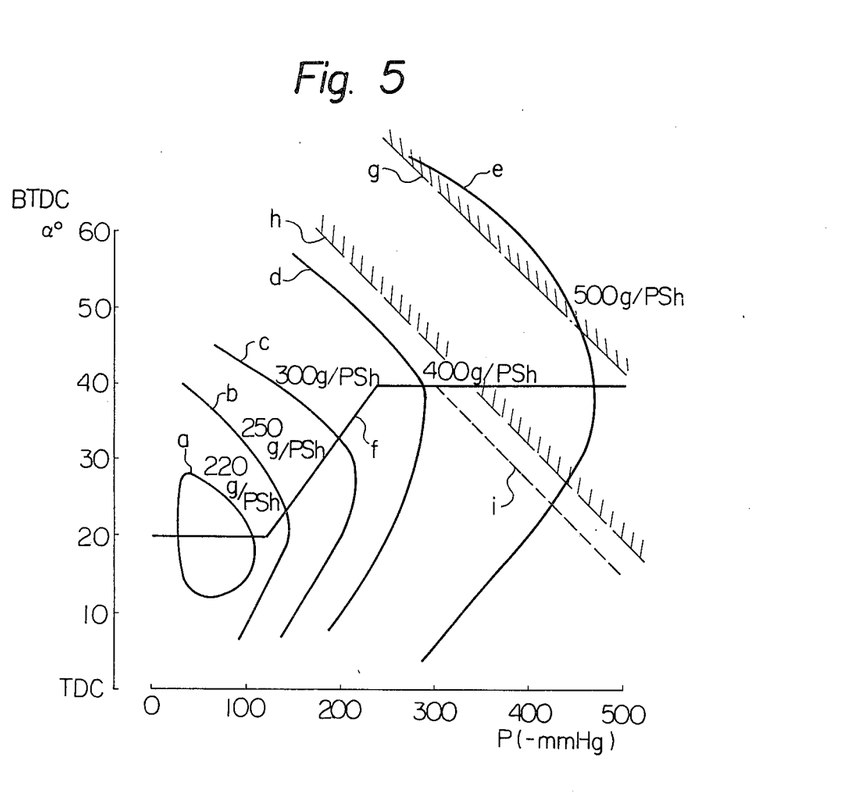
FIG. 5 is a graph showing the relationship between the fuel consumption and the optimum ignition timing.

In FIG. 5, the abscissa indicates the vacuum level P (−mmHg) in the intake manifold of the engine, and the ordinate indicates the ignition timing which is indicated as BTDC $\alpha$°. In addition, in FIG. 5, the curved lines a, b, c, d, e indicate constant fuel consumptions of 220, 250, 300, 400, 500 (g/pshr), respectively. Consequently, in order to maintain the fuel consumption at the lowest level, the ignition timing is usually set as shown by the lines f. As is understood from FIG. 5, if the ignition timing $\alpha$ is advanced or retarded relative to the ignition timing shown by the lines f, the fuel consumption is increased. On the other hand, in FIG. 5, the line g indicates the upper limits of the ignition timing $\alpha$ and the vacuum level P in which the flame can propagate, that is, the limit of occurrence of misfire when the engine is operating at a low speed in a conventional case wherein the ignition device is so set that the discharging arc continuance time is relatively short, as shown by A in FIG. 3. On the other hand, the line h indicates the limit of occurrence of misfire when the engine is operating at a high speed in the above-mentioned conventional case. Consequently, it is understood from FIG. 5 that, if a conventional ignition device is used and the ignition timing is set in the ignition timing shown by f, a misfire is caused when the engine is operating at a high speed and when the engine is operating under a light load, that is, when the vacuum level P is great. In order to prevent the occurrence of such a misfire, the ignition timing can be set so that the ignition timing is retarded as the vacuum level P is increased, as is shown by the broken line i in FIG. 5. However, such a retardation of the ignition timing causes an increase in the fuel consumption. In addition, even if a conventional ignition device is used and the ignition timing is set at the optimum ignition timing f at which the lowest fuel consumption can be obtained, a misfire does not occur in the case wherein the engine is operating at a relatively low speed. In addition, when the engine is operating at a high speed, the frequency of occurrence of misfires is very low as stated previously. Therefore, it is understood that the retardation of the ignition timing is an unpreferable method of preventing the occurrence of misfire.

As is described with reference to FIG. 3, a conventional discharging arc continuance time, when the engine is operating at a high speed, is set in the range of crank angle shown by A. However, in practice, when the engine is operating at a high speed, since the combustible mixture flows in the connecting passage 28 at a high speed, the discharging arc created at the start of the discharging operation is extinguished by the high velocity mixture stream without the discharging arc continuing during the discharging arc continuance time A. Since the discharging arc generated at the start of the discharging operation is caused by so called capacity discharge which is created by causing a dielectric breakdown, this discharging arc has an extremely large energy, and the combustible mixture is usually ignited by the discharging arc caused by the capacity discharge. Even if the discharging arc is extinguished by the high velocity mixture stream, the atmosphere located around the electrode of the spark plug is under a condition in which the discharge arc is apt to generate again. Consequently, the discharging arc is practically caused by so called inductive discharge after the discharging arc is extinguished by the high velocity mixture stream. However, the discharging arc caused by inductive discharge has relatively small energy and, thus, it is impossible to practically ignite the combustible mixture by the discharging arc caused by inductive discharge. As mentioned above, in a conventional ignition device, after the capacity discharge is caused, the inductive discharge is repeatedly caused. Consequently, the discharging arc continuance time practically contributing to the ignition is one half through one third of the discharging arc continuance time shown by A in FIG. 3. As a result, while the igniting operation is practically carried out only at the start of the igniting operation, the flame cannot propagate, thus causing a misfire.

However, it has been proven that, if the discharging electric current is increased to a level of 30 through 50 mA, which is slight larger than the conventional level, and if the discharging time period is elongated as compared with the conventional one, a small inductive discharge is generated after the capacity discharge is generated and, after this, the capacity discharge is generated by causing dielectric breakdown again. Then, the capacity discharge and a small inductive discharge are alternately and repeatedly generated. That is to say, in FIG. 3, if the discharging time period is elongated as is shown by B, the capacity discharge is intermittently generated during the discharging time period B. Consequently, during the time in which the first half of the discharging operation is carried out, since the residual gas ratio R and the velocity Y of the combustible mixture are high and, in addition, the pressure P is low as is shown in FIG. 3, the flame cannot propagate. Contrary to this, during the time in which the latter half of the discharging operation is carried out, since the residual gas ratio R and the velocity U of the combustible mixture are low and, in addition, the pressure P is high, the flame can propagate. As a result of this, the occurrence of misfire can be prevented without retarding the ignition timing.

According to the experiments conducted by the inventors, in an engine in which the ratio of the volume of the auxiliary combustion chamber 27 to the cross-sectional area of the connecting passage 28 is set in the range of 5 through 15 cm, it has been proven that, if the discharging arc continues to generate until the time the piston reaches the vicinity of BTDC 10° when the engine is rotating at 5000 r.p.m, the flame can propagate. In an engine in which the ratio of the volume of the auxiliary combustion chamber 27 to the cross-sectional area of the connecting passage 28 is set in the above-mentioned range, since the ignition timing, by which the lowest fuel consumption can be obtained, is about BTDC 40°, it is necessary to continue the discharging operation during the time length corresponding to the crank angle 30°. The crank angle 30° at the time when the engine is operating at 5000 r.p.m corresponds to about 1 m sec. Consequently, if the discharging operation is continued for 1 m sec, the occurrence of a misfire can be prevented even if the engine is operating at a high speed under a light load close to no load.

As was stated above, if secondary air is fed into the exhaust system of the engine, the residual gas ratio in the main combustion chamber 24 is reduced and, accordingly, the residual gas ratio in the auxiliary combustion chamber 27 is also reduced. Consequently, in this case, the flame can easily propagate and, as a result, the occurrence of misfire can be further prevented. In addition, as shown in FIG. 4, if secondary air is fed into the exhaust system of the engine, the residual gas ratio Ro is relatively low when the engine is operating under a light load in which there is a tendency for a misfire to occur. Consequently, it is very preferable to feed secondary air into the exhaust system of the engine.

While an ignition device for generating a discharging arc in which the discharging electric current is in the range of 30 through 50 mA and, in addition the discharging time length is above 1 m sec, can be easily manufactured, the ignition plug drive power source disclosed in U.S. Pat. No. 3,605,713 can be used.

Figure 6:
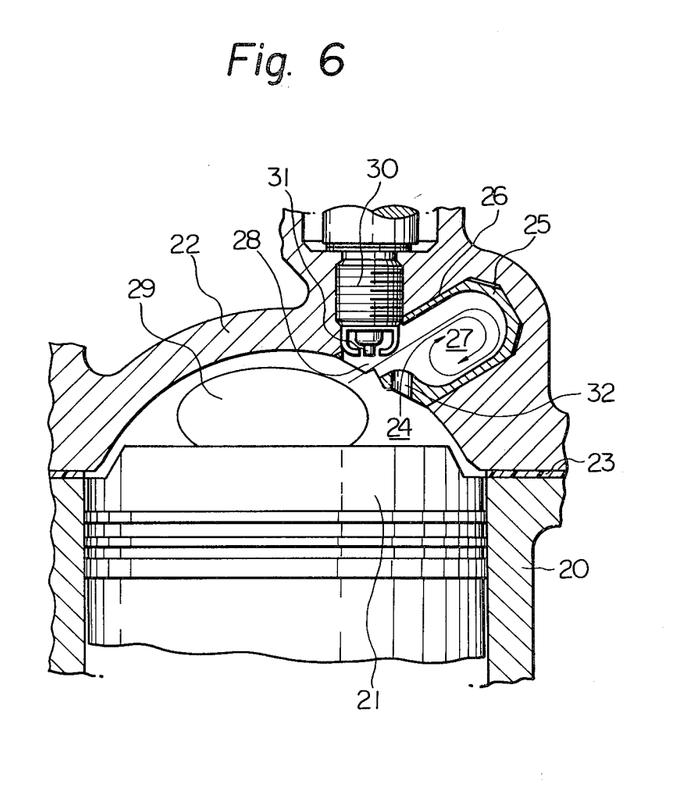
FIG. 6 is a cross-sectional side view of an alternative embodiment according to the present invention.

FIG. 6 shows an alternative embodiment according to the present invention. Referring to FIG. 6, a further connecting passage 32 is provided, in addition to the connecting passage 28. This connecting passage 32 is arranged so as to strengthen the swirl motion created in the auxiliary combustion chamber 27 by the combustible mixture flowing into the auxiliary combustion chamber 27 via the connecting passage 28 at the time of the compression stroke. Consequently, in this embodiment, even if the engine is operating at a low speed, a strong swirl motion is created in the auxiliary combustion chamber 27. Therefore, even if a lean air-fuel mixture having an air-fuel ratio of more than 18:1 or an air-fuel mixture containing therein a large amount of recirculated exhaust gas of more than 10 percent relative to an amount of air fed into the cylinder of the engine is used, the combustion speed is high and, as a result, a stable combustion can be obtained. The cross-sectional areas of the connecting passages 28 and 32 are set so as to be proportional to the volumes of the combustible mixture, which are burned by the burning jets injected from the connecting passages 28 and 32, respectively. In addition, the connecting passages 28 and 32 are arranged so that the burning jet injected from the connecting passage 28 is directed away from the burning jet injected from the connecting passage 32. Consequently, the burning jet is injected so as to reach over the entire space of the main combustion chamber 24 and, as a result, the combustion speed of the combustible mixture in the main combustion chamber 24 is quickened, whereby a stable combustion can be obtained. In this embodiment, the occurrence of misfires can be prevented in such a way that the discharging arc continuance time is set so as to be approximately 1 m sec.

In FIG. 1, an exhaust gas recirculated system is not indicated. However, in order to recirculate the exhaust gas into the intake system from the exhaust system of the engine, an engine must be provided with an exhaust gas recirculating system.

According to the present invention, in an engine in which the ratio of the volume of the auxiliary combustion chamber to the cross-sectional area of the connecting passage is so set that an optimum swirl motion of the combustible mixture is created in the auxiliary combustion chamber when the engine is operating at a relatively low speed for obtaining a stable combustion of an air-fuel mixture such as a lean air-fuel mixture or an air-fuel mixture containing a large amount of recirculated exhaust gas therein, the occurrence of misfire at the time when the engine is operating at a high speed under a light load close to no load can be prevented without using an ignition device of high manufacturing cost and using a complicated ignition timing control device and, in addition, without retarding the ignition timing.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising a reciprocating piston, a main combustion chamber, an auxiliary combustion chamber, at least one chamber forming a possage connecting said main combustion chamber with said auxiliary combustion chamber and arranged to create a swirl motion of the combustible mixture in said auxiliary combustion chamber at the time of the compression stroke of said piston, a spark plug having a spark gap located in one of said chambers at least in the vicinity of said chamber forming the connecting passage, an intake passage for leading an air-fuel mixture into said main combustion chamber, and an exhaust passage for discharging an exhaust gas from said main combustion chamber to the atmosphere, the ratio of the volume of said auxiliary combustion chamber to the cross-sectional area of said chamber forming the connecting passage being in the range of 5 through 15 cm to create a strong swirl motion in said auxiliary combustion chamber, means to maintain the length of the continuance time of the discharging arc created in the spark gap of said spark plug from about BTDC 40° to about BTDC 10° when the engine is operating at a high speed approaching 5000 rpm, and the ignition timing is controllable in accordance with the level of the load on the engine and is at about BTDC 40° when the engine is operating at the high speed under substantially no load and at about BTDC 20° when the engine is operating at the high speed under a substantial load.

2. An engine as claimed in claim 1, further comprising means to maintain the discharging electric current of said discharging arc in the range of 30 through 50 mA.

3. An engine as claimed in claim 1, wherein secondary air is fed into said exhaust passage for promoting the oxidation of unburned components in the exhaust gas and for reducing the ratio of the amount of residual exhaust gas to the amount of an air-fuel mixture in said auxiliary combustion chamber.

4. An internal combustion engine as claimed in claim 1, further comprising means to maintain in said air-fuel mixture at a lean air-fuel mixture having an air-fuel ratio of more than 18:1.

5. An internal combustion engine as claimed in claim 1, further comprising means to maintain in said air-fuel mixture a large amount of recirculated exhaust gas, more than 10 percent relative to the amount of air fed into said main combustion chamber.

6. An internal combustion engine as claimed in claim 1, wherein said means to maintain has a duration of greater than 1 m sec.

* * * * *